US008629205B2

(12) United States Patent
Fessenbecker et al.

(10) Patent No.: US 8,629,205 B2
(45) Date of Patent: Jan. 14, 2014

(54) MICROGELS COMBINED WITH FUNCTIONAL ADDITIVES

(71) Applicants: Lanxess Deutschland GmbH, Leverkusen (DE); Rhein Chemie Rheinau GmbH, Mannheim (DE)

(72) Inventors: Achim Fessenbecker, Waghausel (DE); Patrick Galda, Karlsruhe (DE); Torsten Ziser, Birkenau (DE); Thomas Früh, Limburgerhof (DE); Günther Steppan, Oftersheim (DE); Werner Obrecht, Moers (DE)

(73) Assignees: LANXESS Deutschland GmbH, Cologne (DE); Rhein Chemie Rheinau GmbH, Mannheim (DE)

( * ) Notice: Subject to any disclaimer, the term of this patent is extended or adjusted under 35 U.S.C. 154(b) by 0 days.

(21) Appl. No.: 13/654,666

(22) Filed: Oct. 18, 2012

(65) Prior Publication Data

US 2013/0040864 A1 Feb. 14, 2013

Related U.S. Application Data

(63) Continuation of application No. 11/374,268, filed on Mar. 13, 2006, now abandoned.

(30) Foreign Application Priority Data

Mar. 24, 2005 (DE) .......................... 10 2005 014 271

(51) Int. Cl.
*C10M 143/12* (2006.01)

(52) U.S. Cl.
USPC ........... 524/130; 508/272; 508/322; 508/342; 508/333; 508/507; 977/773

(58) Field of Classification Search
USPC ......................................................... 524/130
See application file for complete search history.

(56) References Cited

U.S. PATENT DOCUMENTS

| | | | |
|---|---|---|---|
| 6,237,333 B1 * | 5/2001 | Lee et al. ......................... | 60/487 |
| 7,842,732 B2 * | 11/2010 | Ziser et al. ....................... | 516/98 |
| 2005/0197443 A1 * | 9/2005 | Ziser et al. ..................... | 524/474 |

FOREIGN PATENT DOCUMENTS

WO WO 2005/030843 * 4/2005

* cited by examiner

*Primary Examiner* — Doris Lee
(74) *Attorney, Agent, or Firm* — Nicanor A. Kohncke

(57) ABSTRACT

The invention relates to a composition comprising at least one microgel and at least one functional additive, to processes for the preparation thereof, to uses of the compositions, and to microgel-containing polymers, rubbers, lubricants, coatings, etc. prepared therefrom.

26 Claims, 1 Drawing Sheet

Operation of homogeniser valve

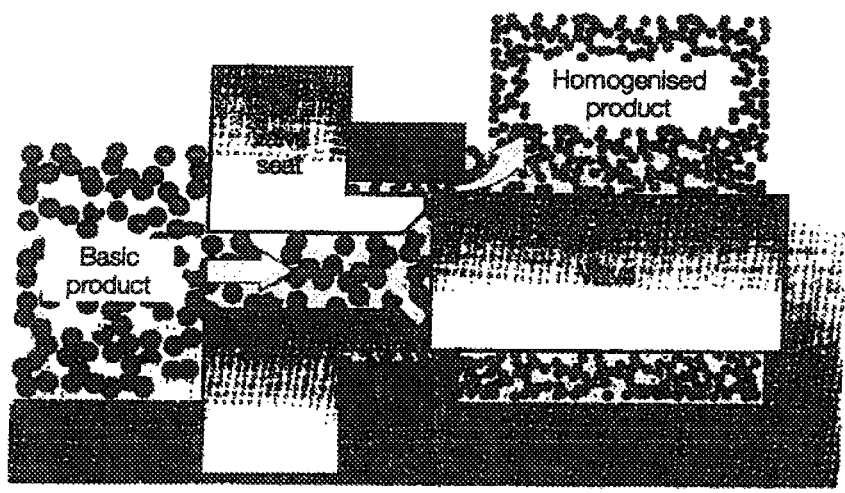
Operation of homogeniser valve

MICROGELS COMBINED WITH FUNCTIONAL ADDITIVES

CROSS REFERENCE TO RELATED PATENT APPLICATIONS

The present patent application is a continuation of Ser. No. 11/374,268 filed 13 Mar. 2006, which is currently pending, which is entitled to the right of priority of German Patent Application No. DE 10 2005 014271.0, filed on 24 Mar. 2005.

FIELD OF THE INVENTION

The invention relates to a composition comprising at least one microgel and at least one functional additive, to processes for the preparation thereof, to uses of the compositions, and to microgel-containing polymers, rubbers, lubricants, coatings, etc. prepared therefrom.

BACKGROUND OF THE INVENTION

It is known to use rubber gels, including modified rubber gels, in mixtures with a wide range of rubbers, for example to improve rolling resistance in the manufacture of motor vehicle tyres (see, for example, DE 42 20 563, GB-PS 10 78 400 EP 405 216 and EP 854 171).

Dispersions of silicone-containing graft polymers in liquid amides, which are also prepared from aqueous lattices, are known from DE-A-3742180. However, in the case of the dispersions described in said document, the water is only substantially separated off, and complete separation is difficult.

Compositions containing microgels and organic media have basically been described in non-anticipatory international application PCT/EP2004/052290 of the present applicant.

The inventors of the present invention have found that it is possible finely to disperse microgels, in particular in liquid functional additives, for example using a homogeniser. The division of the microgels into the primary particle range is, for example, a prerequisite for rendering the nano-characteristics of the microgels particularly useful. The compositions according to the invention containing the specific microgels can open up a large number of microgel applications that were not previously accessible using the microgels themselves.

The microgel/additive combinations have highly beneficial characteristics, for example rheology, consistency, shear stability, thickening effect, etc. The inventors were thus able to prepare combinations of conventional commercial liquid lubricant additives and microgels that, in combination, incorporate positive characteristics of both systems. It has thus been found that a liquid additive is bound by the microgel at the surface or in the network and can be introduced in bound form into a lubricant, for example, from where it is also released again under specific conditions. Surprisingly, it has been found not only that additives allow paste- or fat-like combinations to be obtained, but also that these combinations in fact develop synergistic effects. A transparent "additive fat" having consistency values (dripping temperature, penetration) typical of fats, in contrast to opaque fat structures, is thus obtained, for example, from the combination of a sulphur-functionalised olefin and a microgel. If this additive fat is introduced into base fluids in conventional concentrations, a lubricant formulation that behaves synergistically with respect to the measured values determined for the individual components, additive or microgel, is obtained. Further combinations of sulphur-containing additives or phosphorus-containing additives display a similar, usually paste-like consistency, in some cases a fat-like consistency.

The present invention therefore provides a composition containing at least one microgel (B) and at least one functional additive (C).

Microgels (B)

The microgel (B) used in the composition according to the invention is a crosslinked microgel. In a preferred embodiment, the microgel is not crosslinked by high-energy radiation. The term "high-energy" radiation expediently refers, in this context, to electromagnetic radiation having a wavelength of less than 0.1 μm. The use of microgels crosslinked by high-energy radiation, as described for example in Chinese Journal of Polymer Science, Vol. 20, No. 2, (2002), 93-98, is disadvantageous, as it is virtually impossible to prepare on an industrial scale microgels crosslinked by high-energy radiation. The use of high-energy radiation from radioactive sources such as radioactive cobalt is also associated with serious safety problems.

In a preferred embodiment of the invention, the primary particles of the microgel (B) have an approximately spherical geometry. According to DIN 53206:1992-08, the microgel particles, which may be recognised as individual entities using suitable physical methods (electron microscope) and are dispersed in the coherent phase, are designated as primary particles (cf., for example, Römpp Lexikon, Lacke and Druckfarben, Georg Thieme Verlag, 1998). The term an "approximately spherical" geometry means that, on viewing the composition, for example using an electron microscope, the dispersed primary particles of the microgels may be seen to have a substantially circular surface. Since the microgels do not substantially change their form or morphology during processing of the compositions according to the invention, the foregoing and following remarks similarly also apply to the microgel-containing compositions obtained using the composition according to the invention such as, for example, plastics materials, coating agents, lubricants or the like.

In the primary particles of the microgel (B) that are contained in the composition according to the invention, the deviation in the diameter of an individual particle, defined $$[(d1-d2)/d2] \times 100,$$

wherein d1 and d2 are two arbitrary diameters of the primary particle and d1>d2, is preferably less than 250%, more preferably less than 100%, even more preferably less than 80%, even more preferably less than 50%.

Preferably at least 80%, more preferably at least 90%, even more preferably at least 95% of the primary particles of the microgel exhibit a diameter deviation, defined as $$[(d1-d2)/d2] \times 100,$$

wherein d1 and d2 are two arbitrary diameters of the primary particle and d1>d2, of lees than 250%, preferably less than 100%, more preferably less than 80%, even more preferably less than 50%.

The above-mentioned deviation in the diameters of the individual particles can be determined by the following method. First of all, a thin section of the compacted composition according to the invention is prepared. A transmission electron micrograph enlarged by a factor of, for example, 10,000 or 200,000 is then prepared. In an area of 833.7×828.8 nm, the largest and the smallest diameter of 10 microgel primary particles are determined as d1 and d2. If the above-defined deviation is in each case less than 250%, preferably less than 100%, even more preferably less than 80%, even more preferably less than 50%, in at least 80%, preferably at least 90%, more preferably at least 95% of the measured microgel primary particles, the microgel primary particles exhibit the above-defined feature of deviation.

If the concentration of the microgels in the composition is sufficiently high that the visible microgel primary particles are markedly superimposed, evaluation may be facilitated by appropriate prior dilution of the test sample.

In the composition according to the invention, the primary particles of the microgel (B) preferably exhibit an average particle diameter from 5 to 500 nm, more preferably from 20 to 400 nm, more preferably from 20 to 300 nm, more preferably from 20 to 250 nm, even more preferably from 20 to 99, even more preferably from 40 to 80 (diameters to DIN 53206). The preparation of particularly finely divided microgels by emulsion polymerisation takes place by controlling the reaction parameters in a manner known per se (see, for example, H. G. Elias, Makromoleküle, Vol. 2, Technologie, fifth edition, page 99 ff.).

Since the morphology of the microgels basically does not change during further processing of the composition according to the invention, the average particle diameter of the dispersed primary particles substantially corresponds to the average particle diameter of the dispersed primary particles, in the products of further processing obtained using the composition according to the invention such as microgel-containing plastics materials, lubricants, coatings, etc. This is a particular advantage of the composition according to the invention. Customers may in some cases be provided with tailor-made, liquid microgel formulations, which are stable in storage, have a defined microgel morphology and may easily be processed by customers in the desired applications. Complex prior dispersion, homogenisation or even preparation of microgels is no longer required, so it is expected that microgels of this type will also be used in fields in which their use previously seemed excessively complex.

In the composition according to the invention, the microgels (B) expediently comprise fractions which are insoluble in toluene at 23° C. (gel content) of at least approximately 70% by weight, more preferably at least approximately 80% by weight, even more preferably at least 90% by weight.

The fraction that is insoluble in toluene is determined in toluene at 23° C. 250 mg of the microgel are steeped in 20 ml toluene for 24 hours at 23° C. while shaking. After centrifugation at 20,000 rpm, the insoluble fraction is separated and dried. The gel content is determined from the quotient of the dried residue and the weighed portion and is given as a percentage by weight.

In the composition according to the invention, the microgels (B) expediently exhibit a swelling index of less than approximately 80, more preferably of less than 60, even more preferably of less than 40 in toluene at 23° C. The swelling indices of the microgels (Qi) may thus particularly preferably be between 1-15 and 1-10. The swelling index is calculated from the weight of the solvent-containing microgel steeped in toluene for 24 hours at 23° C. (after centrifugation at 20,000 rpm) and the weight of the dry microgel:

Qi=Wet weight of the microgel/dry weight of the microgel.

In order to determine the swelling index, 250 mg of the microgel is steeped in 25 ml toluene for 24 hours while shaking. The gel is centrifuged off, weighed and then dried at 70° C. until a constant weight is reached and dried again.

In the composition according to the invention, the microgels (B) expediently exhibit glass transition temperatures Tg from −100° C. to +120° C., more preferably from −100° C. to +100° C., even more preferably from −80° C. to +80° C. In rare cases, microgels which, owing to their high degree of crosslinking, do not exhibit a glass transition temperature may also be used.

Moreover, the microgels (B) used in the composition according to the invention preferably exhibit a glass transition temperature range greater than 5° C., preferably greater than 10° C., more preferably greater than 20° C. Microgels that exhibit such a glass transition temperature range, in contrast to completely homogeneously radiation-crosslinked microgels, are generally not completely homogenised. As a result, the change in modulus from the matrix phase to the dispersed phase is not direct in the microgel-containing plastics material compositions prepared, for example, from the compositions according to the invention. Accordingly, in the event of these compositions being subjected to abrupt stress, there are no tearing effects between the matrix and the dispersed phase, so the mechanical characteristics, the swelling behaviour and the stress corrosion cracking, etc. are advantageously influenced.

The glass transition temperatures (Tg) and the glass transition temperature range (ΔTg) of the microgels are determined by differential scanning calorimetry (DSC). under the following conditions: Two cooling/heating cycles are carried out for determining Tg and ΔTg. Tg and ΔTg are determined in the second heating cycle. In order to determine these values, 10-12 mg of the selected microgel are placed in a Perkin-Elmer DSC sample container (standard aluminium pan). The first DSC cycle is carried out by first cooling the sample with liquid nitrogen to −100° C. and then heating it at a rate of 20 K/min to +150° C. The second DSC cycle is started by immediate cooling of the sample as soon as a sample temperature of +150° C. has been reached. The cooling takes place at a rate of approximately 320 K/min. In the second heating cycle, as in the first cycle, the sample is heated once again to +150° C. The heating rate in the second cycle is again 20 K/min. Tg and ΔTg are determined graphically on the DSC curve of the second heating process. For this purpose, three straight lines are plotted on the DSC curve. The first straight line is plotted on the curved portion of the DSC curve below Tg, the second straight line on the branch of the curve extending through Tg with a turning point and the third straight line on the branch of the DSC curve above Tg. Three straight lines with two intersections are thus obtained. Each intersection is characterised by a characteristic temperature. The glass transition temperature Tg is obtained as an average value of these two temperatures and the glass transition temperature range ΔTg is obtained from the difference between the two temperatures.

The microgels that are contained in the composition according to the invention and are preferably not crosslinked by high-energy radiation may be prepared in a manner known per se (see, for example, EP-A-405 216, EP-A-854 171, DE-A 4220563, GB-PS 1078400, DE 197 01 489.5, DE 197 01 488.7, DE 198 34 804.5, DE 198 34 803.7, DE 198 34 802.9, DE 199 29 347.3, DE 199 39 865.8, DE 199 42 620.1, DE 199 42 614.7, DE 100 21 070.8, DE 100 38 488.9, DE 100 39 749.2, DE 100 52 287.4, DE 100 56 311.2 and DE 100 61 174.5). Patents (applications) EP-A-405 216, DE-A 4220563 and GB-PS 1078400 claim the use of CR, BR and NBR microgels in mixtures with double bond-containing rubbers. DE 197 01 489.5 discloses the use of subsequently modified microgels in mixtures with double bond-containing rubbers such as NR, SBR and BR.

The term "microgels" expediently refers to rubber particles obtained, in particular, by crosslinking the following rubbers:
BR: polybutadiene,
ABR: butadiene/acrylic acid/C1-4 alkylester copolymers,
IR: polyisoprene, SBR: styrene/butadiene copolymers having styrene contents from 1-60, preferably 5-50 per cent by weight,
X-SBR: carboxylated styrene/butadiene copolymers
FKM: fluorine rubber,
ACM: acrylate rubber,
NBR: polybutadiene/acrylonitrile copolymers having acrylonitrile contents from 5-60, preferably 10-50 per cent by weight,
X-NBR: carboxylated nitrile rubbers
CR: polychloroprene
IIR: isobutylene/isoprene copolymers having isoprene contents from 0.5-10 per cent by weight,
BIIR: brominated isobutylene/isoprene copolymers having bromine contents from 0.1-10 per cent by weight,
CIIR: chlorinated isobutylene/isoprene copolymers having bromine contents from 0.1-10 per cent by weight,
HNBR: partially and completely hydrogenated nitrile rubbers
EPDM: ethylene/propylene/diene copolymers,
EAM: ethylene/acrylate copolymers,
EVM: ethylene/vinyl acetate copolymers
CO and ECO: epichlorohydrin rubbers,
Q: silicone rubbers, except silicone graft polymers,
AU: polyester urethane polymers,
EU: polyether urethane polymers
ENR: epoxidised natural rubber or mixtures thereof.

SUMMARY OF THE INVENTION

The uncrosslinked microgel starting products are expediently prepared by the following methods:
1. Emulsion polymerisation
2. Solution polymerisation of rubbers not accessible via variant 1
3. Naturally occurring latices such as, for example, natural rubber latex may of course also be used.

BRIEF DESCRIPTION OF THE DRAWINGS

FIG. 1 schematically illustrates the funnel as described for flowability testing.

DETAILED DESCRIPTION OF THE INVENTION

In the thermosetting plastics composition according to the invention, the microgels (B) used are preferably ones that may be obtained by emulsion polymerisation and crosslinking.

In the preparation of the microgels used according to the invention by emulsion polymerisation, the following radically polymerisable monomers, for example, are used: butadiene, styrene, acrylonitrile, isoprene, acrylic and methacrylic acid ester. Tetrafluoroethylene, vinylidene fluoride, hexafluoropropene, 2-chlorobutadiene, 2,3-dichlorobutadiene and double bond-containing carboxylic acids such as, for example, acrylic acid, methacrylic acid, maleic acid, itaconic acid, etc., double bond-containing hydroxy compounds such as, for example, hydroxyethyl methacrylate, hydroxyethyl acrylate, hydroxybutyl methacrylate, amine-functionalised (meth)acrylate, acrolein, N-vinyl-2-pyrrolidone, N-allylurea und N-allyl-thiourea, secondary amino-(meth)-acrylic ester and 2-tert-butylaminoethyl methacrylate and 2-tert-butylaminoethyl methacrylamide, etc. The rubber gel may be crosslinked directly during emulsion polymerisation, for example by copolymerisation with crosslinking multifunctional compounds, or by subsequent crosslinking as described below. Direct crosslinking constitutes a preferred embodiment of the invention. Preferred multifunctional comonomers are compounds comprising at least two, preferably two to four copolymerisable C=C double bonds, such as diisopropenylbenzene, divinylbenzene, divinylether, divinylsulphone, diallyl phthalate, triallyl cyanurate, triallyl isocyanurate, 1,2-polybutadiene, N,N'-m-phenylene maleimide, 2,4-toluylenebis(maleimide) and/or triallyl trimellitate. Other suitable compounds include the acrylates and methacrylates of polyhydric, preferably dihydric to tetrahydric C2 to C10 alcohols such as ethylene glycol, propanediol-1,2, butanediol, hexanediol, polyethylene glycol comprising 2 to 20, preferably 2 to 8 oxyethylene units, neopentyl glycol, bisphenol-A, glycerol, trimethylolpropane, pentaerythritol, sorbitol comprising unsaturated polyesters of aliphatic diols and polyols, and also maleic acid, fumaric acid and/or itaconic acid.

The crosslinking to rubber microgels during emulsion polymerisation may also take place by continuing polymerisation until high conversions are achieved or, in the monomer feed process, by polymerisation with high internal conversions. It is also possible to carry out emulsion polymerisation in the absence of regulators.

For crosslinking the uncrosslinked or lightly crosslinked microgel starting products after emulsion polymerisation, it is best to use the latices that are obtained during emulsion polymerisation. In principle, this method may also be applied to non-aqueous polymer dispersions accessible in a different manner, for example by redissolving. Natural rubber latices may also be crosslinked in this way.

Examples of suitable crosslinking chemicals include organic peroxides such as dicumyl peroxide, t-butylcumyl peroxide, bis-(t-butyl-peroxy-isopropyl)benzene, di-t-butyl peroxide, 2,5-dimethylhexane-2,5-dihydroperoxide, 2,5-dimethylhexine-3,2,5-dihydroperoxide, dibenzoyl peroxide, bis-(2,4-dichlorobenzoyl)peroxide, t-butyl perbenzoate and also organic azo compounds such as azo-bis-isobutyronitrile und azo-bis-cyclohexanenitrile and dimercapto und polymercapto compounds such as dimercaptoethane, 1,6-dimercaptohexane, 1,3,5-trimercaptotriazine und mercapto-terminated polysulphide rubbers such as mercapto-terminated reaction products of bis-chloroethyl formal with sodium polysulphide.

The optimum temperature for carrying out the post-curing is of course dependent on the reactivity of the crosslinking agent. It may be carried out at temperatures from ambient temperature to approximately 180° C., optionally under elevated pressure (see in this regard Houben-Weyl, Methoden der organischen Chemie, fourth edition, Vol. 14/2, page 848). Peroxides are particularly preferred crosslinking agents.

C=C double bond-containing rubbers may also be crosslinked to microgels in dispersion or emulsion with simultaneous partial or complete hydrogenation of the C=C double bond by hydrazine, as disclosed in U.S. Pat. No. 5,302,696 or U.S. Pat. No. 5,442,009 or optionally other hydrogenation agents, for example organometallic hydride complexes.

Before, during or after the post-curing, the particles may optionally be enlarged by agglomeration.

In the preparation process preferably used according to the invention without the application of high-energy radiation, microgels that are incompletely homogeneously crosslinked and may exhibit the above-described advantages are always obtained.

Rubbers prepared by solution polymerisation may also be used as starting products for the preparation of the microgels. In such cases, suitable organic solutions of these rubbers are Used as starting materials.

The desired sizes of the microgels are prepared by mixing the rubber solution in a liquid medium, preferably in water, suitable surface-active auxiliaries such as, for example, surfactants optionally being added using suitable units, so a dispersion of the rubber in the appropriate particle size range is obtained. For crosslinking the dispersed solution rubbers, the procedure is the same as that previously described for the subsequent crosslinking of emulsion polymers. Suitable crosslinking agents include the above-mentioned compounds, wherein the solvent used for preparing the dispersion may optionally be removed, for example by distillation, prior to crosslinking.

Both non-modified microgels comprising substantially no reactive groups, in particular at the surface, and modified microgels comprising functional groups, in particular at the surface, may be used as microgels for preparing the composition according to the invention. Sold modified microgels may be prepared by chemical reaction of the microgels that have already been crosslinked with chemicals that are reactive toward C=C double bonds. These reactive chemicals are, in particular, compounds by means of which polar groups such as, for example, aldehyde, hydroxyl, carboxyl, nitrile, etc., groups and sulphur-containing groups such as, for example, mercapto, dithiocarbamate, polysulphide, xanthogenate, thiobenzothiazole and/or dithiophosphoric acid groups and/or unsaturated dicarboxylic acid groups may be chemically bound to the microgels. This also applies to N,N'-m-phenylenediamine. The aim of the microgel modification is to improve the microgel compatibility if the composition according to the invention is used for preparing the subsequent matrix, into which the microgel is incorporated, or the composition according to the invention is used for incorporation into a matrix to achieve effective dispersibility during the preparation process and effective linking.

Particularly preferred modification methods include the grafting of the microgels with functional monomers and the reaction with low-molecular agents.

The starting material for the grafting of the microgels with functional monomers is expediently the aqueous microgel dispersion, which is reacted under the conditions of radical emulsion polymerisation with polar monomers such as acrylic acid, methacrylic acid, itaconic acid, hydroxyethyl-(meth)-acrylate, hydroxypropyl-(meth)-acrylate, hydroxybutyl-(meth)-acrylate, acrylamide, methacrylamide, acrylonitrile, acrolein, N-vinyl-2-pyrrolidone, N-allyl-urea and N-allyl-thiourea and also secondary amino-(meth)-acrylic esters such as 2-tert-butylaminoethyl methacrylate and 2-tert-butylaminoethyl methacrylamide. Microgels having a core/shell morphology are thus obtained, wherein the shell is to exhibit a high degree of compatibility with the matrix. It is desirable that the monomer used in the modification step grafts as quantitatively as possible onto the unmodified microgel. Expediently, the functional monomers are added prior to the complete crosslinking of the microgels.

In principle, grafting of the microgels in non-aqueous systems is also conceivable, thus also allowing monomer modification using ionic polymerisation methods.

The following reagents are particularly suitable for a surface modification of the microgels with low-molecular agents: elemental sulphur, hydrogen sulphide and/or alkylpolymercaptans such as 1,2-dimercaptoethane or 1,6-dimercaptohexane, and also dialkyl and dialkylaryl dithiocarbamate and the alkali-metal salts of dimethyl dithiocarbamate and/or dibenzyl dithiocarbamate, also alkyl and aryl xanthogenates such as potassium ethyl xanthogenate and sodium isopropyl xanthogenate and the reaction with the alkali or alkaline-earth salts of dibutyldithiophosphoric acid and dioctyldithiophosphoric acid and dodecyldithiophosphoric acid. The aforementioned reactions may also advantageously be carried out in the presence of sulphur, wherein the sulphur is also incorporated, with the formation of polysulphide bonds. For the addition of this compound, radical initiators such as organic and inorganic peroxides and/or azo initiators may be added.

Modification of double bond-containing microgels, for example by ozonolysis and by halogenation with chlorine, bromine and iodine, is also possible. A further reaction of modified microgels, for example the preparation of hydroxyl group-modified microgels from epoxidised microgels, is also understood as a chemical modification of microgels.

In a preferred embodiment, the microgels are modified by hydroxyl groups, in particular at the surface thereof. The hydroxyl group content of the microgels is determined by reaction with acetic anhydride and titration of the acetic acid hereby released with KOH to DIN 53240 as a hydroxyl value having the units mg KOH/g polymer. The hydroxyl value of the microgels is preferably between 0.1 and 100, more preferably between 0.5 and 50 mg KOH/g polymer.

The amount of modification agent used is determined by the efficacy thereof and individual requirements, and is in the range from 0.05 to 30 per cent by weight, based on the total amount of rubber microgel used, 0.5 to 10 per cent by weight being particularly preferred.

The modification reactions may be carried out at temperatures from 0-180° C., preferably 20-95° C., optionally under a pressure of 1-30 bar. The modifications may be carried out on rubber microgels in substance or in the form of the dispersion thereof, wherein inert organic solvents or even water may be used as a reaction medium in the latter case. Particularly preferably, the modification is carried out in an aqueous dispersion of the crosslinked rubber.

The average diameter of the prepared microgels may be adjusted with high accuracy, for example, to 0.1 micrometers (100 nm)+/−0.01 micrometer (10 nm), so a particle size distribution, for example, wherein at least 75% of all of the microgel particles are between 0.095 micrometers and 0.105 micrometers, is achieved. Other average diameters of the microgels, in particular in the range between 5 and 500 nm, may be prepared and used with equal accuracy (at least 75% by weight of all of the particles lie in a range of +10% above and below the peak of the integrated particle size distribution curve (determined by light scattering)). This allows the morphology of the microgels dispersed in the composition according to the invention to be adjusted with almost "pinpoint" accuracy, and hence the properties of the composition according to the invention and the plastics materials prepared therefrom, for example, to be adjusted.

The microgels prepared in this manner, which are preferably based on BR, SBR, NBR, SNBR, or acrylonitrile or ABR, may be worked up, for example, by evaporation, coagulation, by co-coagulation with a further latex polymer, by freeze coagulation (cf. U.S. Pat. No. 2,187,146) or by spray-drying. In the case of working up by spray-drying, conventional commercial flow promotion agents such as $CaCO_3$ or silicic acid may be added.

In a preferred embodiment of the composition according to the invention, the microgel (B) is based oh rubber.

In a preferred embodiment of the composition according to the invention, the microgel (B) is modified by functional groups reactive toward C=C double bonds.

In a preferred embodiment, the microgel (B) has a swelling index from 1 to 15 in toluene at 23° C.

The composition according to the invention preferably has a viscosity from 2 mPas up to 50,000,000 mPas, preferably 50 mPas up to 3,000,000 mPas, at a speed of rotation of 5 s$^{-1}$, measured using a cone-and-plate viscometer to DIN 53018 at 20° C.

Organic Non-Crosslinkable Medium (A)

The composition according to the invention may contain one or more organic media (A) having a viscosity of less than 30,000 mPas, more preferably of less than 1,000 mPas, more preferably of less than 200 mPas, more preferably of less than 100 mPas, even more preferably of less than 20 mPas at a temperature of 120° C.

A medium of this type is preferably in a liquid to solid, preferably liquid to free-flowing state at ambient temperature (20° C.).

The term "organic medium", as used in the present invention, refers to a medium containing at least one carbon atom.

The term "non-crosslinkable media", as used in the present invention, refers, in particular, to Media of the type not containing any groups that are crosslinkable via heteroatom-containing functional groups or C=C groups such as, in particular, conventional monomers or prepolymers that are crosslinked or polymerised, in the conventional manner, radically, with UV radiation, thermally and/or by polyaddition or polycondensation, crosslinking agents (for example polyisocyanates, polyamines, acid anhydrides, etc.) being added and oligomers or polymers being formed. According to the invention, organic, non-crosslinkable media used may also be media that contain, for example, specific fractions of unsaturated bonds (specific polyester oils, rape-seed oil, etc.) or hydroxy groups (polyether), but are not crosslinked or polymerised in the conventional manner to form oligomers or polymers. The non-crosslinkable media are also, in particular, solvents, especially solvents to DIN 55 945.

Preferred are non-reactive solvents to DIN 55 945 such as hexane, special boiling-point spirits, petroleum spirits, xylene, solvent naphtha, balsam turpentine, methyl ethyl ketone, methyl isobutyl ketone, methylamyl ketone, isophorone, butyl acetate, 1-methoxy propyl acetate, butyl glycol acetate, ethyl diglycol acetate and N-methyl pyrrolidone (Brock, Thomas, Groteklaes, Michael, Mischke, Peter, Lehrbuch der Lacktechnologie, Curt R. Vincentz Verlag, Hanover, (1998) 93ff).

Particularly preferred non-crosslinkable media include: polyether, for example Baylube 68CL, naphthenic oils, for example Nynas T 110, paraffinic, highly refined mineral oils, for example Shell Catenex S 932, ester oils, for example methyl ester SU, oils based on renewable raw materials, for example refined rape-seed oil. Particularly preferred non-crosslinkable media (A) include the main class of hydrocarbons such as, for example, poly-alpha olefins, hydrocrack oils, hydrotreated oils, etc., the polyether oils, and the solvents to DIN 55 945.

In a preferred embodiment, the composition according to the invention does not contain component (A).

In a further preferred embodiment, the composition according to the invention consists only of components (B) and (C).

Functional Additives (C)

The term "functional additives (C)", as used in the present application, refers to all substances that are added in small quantities to other substances or substance mixtures in order to alter in a desirable manner their characteristics or to facilitate their processability. Such additives are in particular, but not exclusively organic compounds comprising functional groups.

Preferably, the functional additive (C) is at least one compound containing at least one heteroatom, preferably at least two heteroatoms, selected from the group consisting of sulphur, phosphorus, nitrogen, halogen and oxygen.

The functional additive (C) is preferably a compound selected from the group consisting of: compounds suitable as high-pressure additives such as organic polysulphides based on sulphurised olefins, organic polysulphides based on sulphurised triglycerides, fatty acid esters, fatty alcohols, etc. organic polysulphides based on sulphurised oils; other sulphur-containing compounds such as xanthogenates, thiourea derivatives, etc.; organic chlorine compounds such as, for example, chlorinated paraffins, etc.; organic nitrogen compounds such as, for example, carbamic acid esters, etc.; compounds suitable as antiwear additives such as phosphorus-containing compounds, for example phosphoric acid esters, phosphonates, alkyl aryl phosphines, phosphites, etc.; phosphorus- and sulphur-containing derivatives such as, for example, metal dialkyl dithiophosphates, diaryl and dialkyl dithiophosphates, monoalkyl and monoaryl dithiophosphates, etc.; phosphorus- and nitrogen-containing compounds such as, for example, amine-neutralised phosphoric acid derivatives, etc.; phosphorus- and chlorine-containing compounds such as, for example, chlorine-containing phosphorus compounds; compounds suitable as antiwear additives such as, for example, neutralised alkali salts and alkaline-earth salts of sulphonic acids and the derivatives thereof such as, for example, esters, etc.; neutralised monocarboxylic and dicarboxylic acids such as, for example, naphthenic acid, salicylic acid, etc. and the derivatives thereof such as, for example, alkali and alkaline-earth salts, esters, amides, etc.; fatty oil and fatty acid derivatives; compounds suitable as non-ferrous metal inhibitors such as triazole derivatives, for example, benzotriazole, thiadiazole derivatives such as, for example, dimercaptothiadiazoles, etc.; compounds suitable as antioxidants such as alkyl/aryl-substituted phenol derivatives, alkyl/aryl-substituted amine derivatives; other phosphorus or sulphur-containing phenol/amine derivatives; compounds suitable as friction modifiers such as metal-containing organic compounds such as, for example, molybdenum, antimony, dithiocarbamates or dithiophosphates, etc.; fatty acid or fatty alcohol derivatives such as, for example, fatty acid amides, polyolesters, phthalates, sebacates, benzoates, adipates, etc.; compounds suitable as surface-active substances such as detergents, for example alkyl/aryl fatty acid derivatives, alkyl/aryl sulphonic acid derivatives, alkyl phenol derivatives, etc.; compounds suitable as dispersing agents such as, for example, esterification products of dicarboxylic acids and glycols, etc.; also pour-point depressants, viscosity index improvers, defoaming agents, deaerators, flow control agents, tackifiers, etc.; compounds suitable as catalysts such as, for example, accelerators such as, for example, mercaptobenzothiadiazole derivatives, etc., compounds suitable as crosslinking agents such as, for example, urea, triazine, carbamic acid derivatives, etc.

Component (C) is particularly preferably one of the following compounds: compounds suitable as high-pressure additives such as organic polysulphides based on sulphurised olefins, organic polysulphides based on sulphurised triglycerides, fatty acid esters, fatty alcohols, etc., organic polysulphides based on sulphurised oils; organic chlorine compounds such as, for example, chlorinated paraffins, etc.; organic nitrogen compounds such as, for example, carbamic acid esters, etc.; compounds suitable as antiwear additives such as phosphorus-containing components, for example phosphonates, phosphites, etc.; phosphorus and sulphur-containing derivatives such as, for example, metal dialkyl dithiophosphates, diaryl and dialkyl dithiophosphates, etc.; phosphorus- and nitrogen-containing compounds such as, for example, amine-neutralised phosphoric acid derivatives, etc.; compounds suitable as antiwear additives such as, for example, neutralised alkali salts and alkaline-earth salts of sulphonic acids and the derivatives thereof such as, for example, esters, etc. neutralised monocarboxylic and dicarboxylic acids such as, for example, naphthenic acid, salicylic acid, etc. and the derivatives thereof such as, for example, alkali and alkaline-earth salts, esters, amides, etc.; fatty oil and fatty acid derivatives; compounds suitable as non-ferrous metal inhibitors such as triazole derivatives, for example, benzotriazole, thiadiazole derivatives such as, for example, dimercaptothiadiazoles, etc.; compounds suitable as antioxidants such as alkyl/aryl-substituted phenol derivatives, alkyl/aryl-substituted amine derivatives; compounds suitable as friction modifiers such as metal-containing organic compounds such as, for example, molybdenum, antimony, dithiocarbamates or dithiophosphates, etc.; fatty acid or fatty alcohol derivatives such as, for example, fatty acid amides, phthalates, sebacates, adipates, etc.; compounds suitable as surface-active substances such as detergents such as, for example, alkyl/aryl sulphonic acid derivatives, alkyl phenol derivatives, etc.; compounds suitable as dispersing agents such as, for example, esterification products of dicarboxylic acids and glycols, etc.; also defoaming agents, deaerators, flow control agents, tackifiers, etc.; compounds suitable as catalysts such as, for example, accelerators such as, for example mercaptobenzothiadiazole derivatives, etc., compounds suitable as crosslinking agents such as, for example, carbamic acid derivatives, etc.

The functional additive (C) preferably has a viscosity of less than 1,000 mPas at a temperature of 120° C. Particularly preferably, it is in a liquid or free-flowing state at ambient temperature.

The composition according to the invention preferably contains 0.5 to 99.9% by weight, more preferably 10 to 90% by weight, even more preferably 20 to 70% by weight, of the microgel (B), based on the total quantity of the composition, wherein each of the aforementioned upper and lower limits may also be independent of one another.

The composition according to the invention also preferably contains 0.1 to 99.5% by weight, more preferably 10 to 90% by weight, more preferably 30 to 80% by weight, more preferably 40 to 97% by weight, even more preferably 50 to 95% by weight, even more preferably 60 to 90% by weight, of the functional additive (C), wherein each of the aforementioned upper and lower limits may also be independent of one another.

The composition according to the invention preferably consists of the microgel (B) and the functional additive. The presence of water is, in particular, not preferred. The compositions according to the invention preferably contain less than 0.8% by weight, even more preferably less than 0.5% by weight, of water. Most preferably, the presence of water is ruled out (<0.1% by weight).

The composition according to the invention may contain one, two, three or more of the functional additives. According to the invention, what are known as additive packets, which contain more than one functional additive bound or absorbed by the microgel (B), in particular, are preferred.

The composition according to the invention may also contain pigments and fillers such as inorganic and organic pigments, siliceous fillers such as kaolin, talc, carbonates such as calcium carbonate and dolomite, barium sulphate, metal oxides such as zinc oxide, calcium oxide, magnesium oxide, aluminium oxide, highly disperse silicas (precipitated and thermally prepared silicas), metal hydroxides such as aluminium hydroxide and magnesium hydroxide, glass fibres and glass-fibre products (slats, strands or glass micro-beads), carbon fibres, thermoplastic fibres (polyamide, polyester, aramide), rubber gels based on polychloroprene and/or polybutadiene or else any other of the above-described gel particles having a high degree of crosslinking and a particle size from 5 to 1,000 nm.

The aforementioned fillers may be used individually or in a mixture. In a preferred embodiment, the composition according to the invention is prepared by mixing at least one functional additive (C), in particular one having a viscosity of less than 30,000 mPas at a temperature of 120° C., and at least one dry microgel powder (B) (preferably less than 1% by Weight, even more preferably less than 0.5% by weight, of volatile fractions (no microgel latices are used when mixing the components (A) and (B)), using a homogeniser, a bead mill, a triple roller, a single or multiple extruder screw, a kneader and/or a dissolver, preferably using a homogeniser, a bead mill or a triple roller.

As far as the viscosity of the composition to be prepared is concerned, the kneader, in which only very highly viscous (almost solid to solid) compositions may preferably be used, is the most limited option, i.e. it may be used only in special cases.

The drawbacks of the bead mill are the comparatively limited viscosity range (usually low-viscosity compositions), the high degree of effort required for cleaning it, the complex exchange of product of the compositions that may be used, and also the wear to the balls and grinding equipment.

Particularly preferably, the compositions according to the invention are homogenised by a homogeniser or a triple roller. The drawbacks of the triple roller are the comparatively limited viscosity range (usually very high-viscosity compositions), the low throughput and unenclosed mode of operation (poor protection during operation). Very preferably, the compositions according to the invention are therefore homogenised by a homogeniser. The homogeniser allows low-viscosity and high-viscosity compositions to be processed at a high throughput (high degree of flexibility). Exchanges of product are comparatively rapid and simple.

The microgels (B) may be dispersed in liquid additives in a surprising and novel manner. The fact that even the primary particles could be dispersed is particularly surprising.

The microgels (B) are dispersed in liquid additives (C) in the homogenising valve in the homogeniser (see FIG. 1).

In the process preferably used according to the invention, agglomerates are broken down into aggregates and/or primary particles. Agglomerates are physically separable units, during the dispersion of which the primary particle size remains unaltered.

FIG. 1 shows the mode of operation of the homogeniser valve.

In the diagram, the terms used are:
"basic product",
"valve seat",
"valve" and
"homogenised product".

The product to be homogenised enters the homogenising valve at a slow speed and is accelerated to high speeds in the homogenising gap. Dispersion takes place after the gap principally as a result of turbulence and cavitation (William D. Pandolfe, Peder Baekgaard, Marketing Bulletin of the APV Homogeniser Group—"High-pressure Homogenisers: Processes, Product and Applications").

The temperature of the composition according to the invention, on entering the homogeniser, is expediently −40-140° C., preferably 20-80° C.

The composition according to the invention to be homogenised is expediently homogenised in the device at a pressure from 20 to 4,000 bar, preferably 100 to 4,000 bar, preferably 200 to 4,000 bar, preferably 200 to 2,000 bar, very preferably 500 to 1,500 bar. The number of cycles is determined by the desired dispersion quality and may vary between one and 20, preferably between one and ten, more preferably between one and four, cycles.

lising dispersing agent combination results in a significant improvement in the cap diameter compared to the mineral oil, without significantly reducing the fusion load.

Finally, the combination of additive, microgel/stabilising dispersing agent and mineral oil results in a significant improvement in both variables compared to the mineral oil, i.e. the fusion load is increased and the cap diameter decreased.

|  | Mixture 1 | Base medium | Mixture 2 | Mixture 3 |
|---|---|---|---|---|
| Composition | 2% additive, 0.66% microgel/1% dispersing agent, 96.37% mineral oil | Pure mineral oil | 2% additive, 98% mineral oil | 0.66% microgel, 1% dispersing agent, 98.37% mineral oil |
| Four-ball tester, fusion load [DIN 51350, Part 2] | 4,600N | 800N | 3,000N | 1,400N |
| Four-ball tester, cap [DIN 51350, Part 3], 1 hour/1,500 rpm/300N | 0.63 mm | 0.68 mm | 0.70 mm | 0.50 mm |

The compositions prepared according to the invention accordingly have a particularly fine particle distribution, which is achieved, in particular, using the homogeniser, which is also extremely advantageous in terms of the flexibility of the process with regard to varying viscosities of the liquid additives and the resultant compositions, and necessary temperatures, and also in terms of the quality of dispersion.

The invention further relates to the use of the composition according to the invention for the preparation of microgel-containing polymers or plastics materials.

The invention will be described in greater detail with reference to the following examples. The invention is, of course, not restricted to these examples.

The present invention has been described with reference to specific details of particular embodiments thereof. It is not intended that such details be regarded as limitations upon the scope of the invention except insofar as and to the extent that they are included in the accompanying claims.

EXAMPLE

The following additive/microgel combinations according to the invention were prepared and then incorporated into a lubricating oil.

A combination of additive and microgel in mineral oil was tested both in comparison to pure mineral oil and in comparison to mixtures of the individual additive in mineral oil or of the microgel in mineral oil. A dispersing agent promoting stabilisation was added to the microgel.

Typical characteristics of the stress and wear behaviour of lubricants were tested to DIN 51350 in what is known as the four-ball tester. The description of the test equipment and of the tests carried out may be inferred from DIN 51350, Part 1 to Part 3. The load limit up to the point of fusion—known as the fusion load—was determined in N in accordance with DIN 51350, Part 2.

The wear characteristic—known as the cap diameter—was determined in mm in accordance with DIN 51350, Part 3.

Results:

Whereas the additive/mineral oil combination results in an improved fusion load compared to the mineral oil, without significantly affecting the cap diameter, the microgel/stabi- Conclusion:

The tests demonstrate a synergistic effect of the microgel/additive combination used. It is believed that by adding the microgel, the additive may be bound partly at the surface, partly by diffusion in a kind of top structure. On the one hand, it seems that the additive may have a more targeted effect in mixtures during the measuring process either as a result of homogeneous incorporation or as a result of slow release.

In lubricants, in particular, mainly fats and pastes, but also solutions, the additive/microgel combinations according to the invention are capable of achieving a more efficient effect for a lubricant, for example, by means of a targeted release of additive. The combinations are notable for significantly simpler handling of the fat/pastes compared to the individual components, liquid additive and microgel powder. In the case of lubricating greases, in particular, combinations of this type are able to prevent the loss in consistency that otherwise occurs in fats when liquid additives are added.

What is claimed is:

1. A composition, consisting essentially of:
    at least one non-crosslinkable organic medium (A), wherein said at least one non-crosslinkable organic medium (A) has a boiling point greater than 120° C. and further does not contain any groups crosslinkable by either a heteroatom-containing functional group or a carbon-carbon double bond group,
    at least one powder microgel (B) comprising primary particles wherein the primary particles have an average particle size of less than 99 nm, and
    at least one liquid functional additive containing at least two heteroatoms selected from the group consisting of sulphur, phosphorus, halogen, and oxygen (C), wherein said liquid functional additive is in a liquid state at ambient temperature.

2. The composition according to claim 1, wherein the powder microgels (B) comprise fractions which are insoluble in toluene at 23° C. of at least approximately 70% by weight.

3. The composition according to claim 1, wherein the powder microgels (B) have a swelling index of less than 80 in toluene at 23° C.

4. The composition according to claim 1, wherein the powder microgels (B) have a glass transition temperature from −100° C. to +120° C.

5. The composition according to claim 1, wherein the powder microgel (B) is crosslinked by means other than high-energy radiation.

6. The composition according to claim 1, wherein the powder microgels (B) have a glass transition temperature greater than 5° C.

7. The composition according to claim 1, wherein the powder microgels (B) are obtained by emulsion polymerization.

8. The composition according to claim 1, wherein the powder microgel (B) is derived from rubber.

9. The composition according to claim 1 wherein the powder microgel (B) is based derived from homopolymers or random copolymers.

10. The composition according to claim 1, wherein the powder microgel (B) is modified by functional groups reactive toward carbon-carbon double bonds.

11. The composition according to claim 1, wherein the liquid functional additive (C) has a viscosity of less than 1,000 mPas at a temperature of 120° C.

12. The composition according to claim 1, wherein the microgel (B) is contained in the amount of from 0.1 to 99.9% by weight of the powder microgel (B) based on the total quantity of the composition.

13. The composition according to claim 1, further consisting essentially of at least one filler.

14. The composition according to claim 1, wherein said composition has a viscosity from 2 mPas up to 50,000,000 mPas at a speed of rotation of 5 s$^{-1}$, determined using a cone-and-plate measuring system to DIN 53018 at 20° C.

15. The composition according to claim 1, wherein the powder microgel (B) has a swelling index from 1 to 15 in toluene at 23° C.

16. The composition according to claim 1, wherein the powder microgel (B) comprise fractions which are insoluble in toluene at 23° C. of at least 95% by weight.

17. The composition according to claim 1, wherein the powder microgel (B) is not modified by hydroxyl groups.

18. The composition according to claim 1, wherein the powder microgel (B) is not modified.

19. The composition according to claim 1, wherein said composition is prepared by mixing the liquid functional additive (C), the powder microgel (B) and the non-crosslinkable organic medium (A) using a homogeniser, a bead mill (attrition mill), a triple roller, a single or multiple extruder screw, a kneader, an Ultra-Turrax device and/or a dissolver.

20. The composition according to claim 19 prepared using the homogeniser, the bead mill (attrition mill), the triple roller or the dissolver.

21. The composition according to claim 1, wherein the primary particles have an approximately spherical geometry.

22. The composition according to claim 21, wherein the deviation in the diameter of the primary particles is less than 250%, when represented by the formula $$[(d1-d2)/d2] \times 100\%,$$

where d1 and d2 are two arbitrary diameters of the primary particle and d1>d2.

23. The composition according to claim 22, wherein the deviation is less than 50%.

24. A process for preparing thermoplastic polymers, comprising:
incorporating the composition according to claim 1 into said thermoplastic polymers.

25. A process for preparing a thermoplastic elastomer, comprising:
incorporating the composition according to claim 1 into said thermoplastic elastomer.

26. A process for preparing a rubber, comprising:
incorporating the composition according to claim 1 into said rubber.

* * * * *